United States Patent
Atago et al.

[11] Patent Number: 5,964,199
[45] Date of Patent: Oct. 12, 1999

[54] DIRECT INJECTION SYSTEM INTERNAL COMBUSTION ENGINE CONTROLLING APPARATUS

[75] Inventors: Takeshi Atago; Shimada Kousaku, both of Hitachinaka, Japan

[73] Assignee: Hitachi, Ltd., Tokyo, Japan

[21] Appl. No.: 08/998,738

[22] Filed: Dec. 29, 1997

[30] Foreign Application Priority Data

Dec. 25, 1996 [JP] Japan .................................. 8-344933

[51] Int. Cl.⁶ .................................................. F02B 17/00
[52] U.S. Cl. ........................................ 123/295; 123/305
[58] Field of Search .................................. 123/295, 305, 123/679, 430, 435, 436

[56] References Cited

U.S. PATENT DOCUMENTS

| | | | |
|---|---|---|---|
| 4,955,339 | 9/1990 | Sasaki et al. | 123/295 |
| 5,078,107 | 1/1992 | Morikawa | 123/295 |
| 5,313,920 | 5/1994 | Matsushita | 123/295 |
| 5,331,933 | 7/1994 | Matsushita | 123/295 |
| 5,666,916 | 9/1997 | Fujieda et al. | 123/295 |
| 5,713,325 | 2/1998 | Yoshida et al. | 123/295 |
| 5,722,362 | 3/1998 | Takano et al. | 123/295 |

FOREIGN PATENT DOCUMENTS 62-191622  8/1987  Japan .

*Primary Examiner*—Erick R. Solis
*Attorney, Agent, or Firm*—Evenson, McKeown, Edwards & Lenahan, P.L.L.C.

[57] ABSTRACT

In a direct injection internal combustion engine, a stratification combustion condition, a homogeneous combustion condition and an intermediate combustion condition which is intermediate the stratification combustion and the homogeneous combustion conditions are controlled selectively according to an operation condition of at least one selected from a combustion condition, an output condition of the engine and an acceleration condition of a vehicle. Without defeating an intended low fuel consumption operation, the engine operates to obtain a reduction of harmful exhaust gas. As a result, by assuring the low fuel consumption operation, an improvement in combustion stability and smoke reduction can both be realized.

14 Claims, 16 Drawing Sheets

Ne=1400rpm
A/F=40

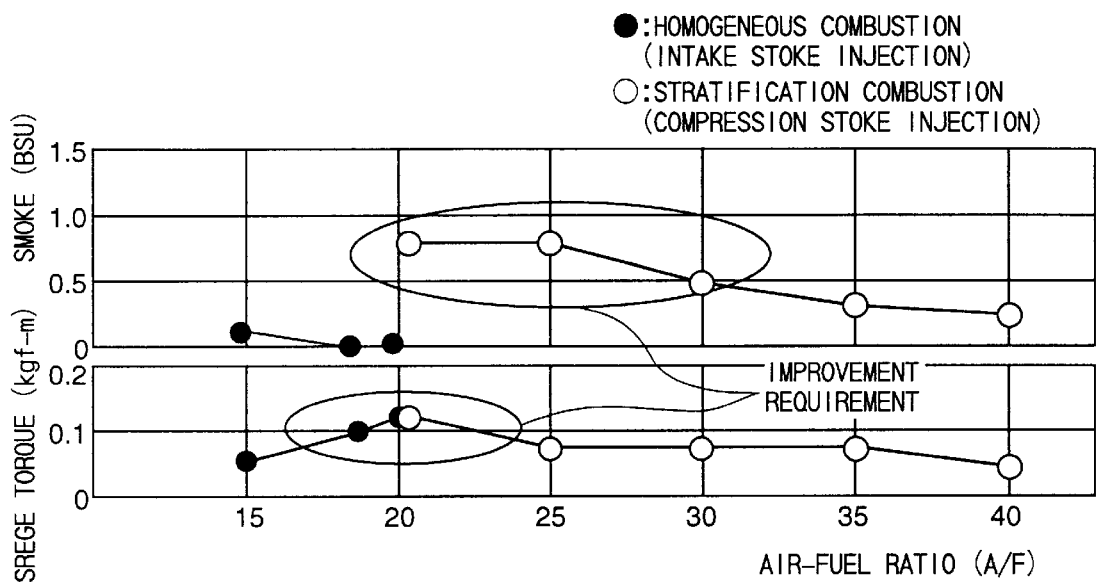

DIRECT INJECTION SYSTEM INTERNAL COMBUSTION ENGINE CONTROLLING APPARATUS

BACKGROUND AND SUMMARY OF THE INVENTION

This a application claims the priority of Japanese application No. 8-344933, filed Dec. 25, 1996, the disclosure of which is expressly incorporated by reference herein.

The present invention relates to a direct injection system internal combustion engine controlling apparatus, and more particularly, to a fuel controlling apparatus of a direct injection internal combustion engine and a fuel controlling apparatus of a vehicle having a direct injection internal combustion engine. An operation condition of the internal combustion engine controlling apparatus and the vehicle having the internal combustion engine is discriminated, and the fuel for the internal combustion condition engine controlling apparatus and the vehicle is controlled by accompanying with the above stated discrimination relating to the operation condition.

A conventional fuel controlling apparatus of a direct injection internal combustion engine is shown, for example, in Japanese patent laid-open publication No. Sho 62-191, 622 . In this document, the internal combustion engine comprises a two-layer structure piston and a combustion chamber. The two-layer structure piston has a shallow plate portion and a depth plate portion which are provided on an apex portion of the piston.

However, in the above stated conventional direct injection internal combustion engine technique, to promote a fuel atomization of the internal combustion engine in which the apex portion of the piston has the two-layer structure piston, at a high load area the fuel is dividingly injected during both an intake stroke and a compression strokes, and further both at a middle load area and at a low load area the fuel is injected singly during only the compression stroke.

As stated above, in the above conventional fuel controlling apparatus of the direct injection internal combustion engine technique, at the high load area the divided fuel injection is carried out during both the intake stroke and the compression stroke, and at both the middle load area and at the low load area the single fuel injection is carried out during only the compression stroke.

However, in the above stated conventional fuel controlling apparatus of the direct injection internal combustion engine technique, no consideration is given to a selection of an optimum combustion condition of a stratification combustion, an intermediate combustion and a homogeneous combustion according to a combustion stability property of the internal combustion engine, for example, such a combustion stability property is determined in accordance with an output condition and an acceleration condition of the vehicle.

Further, in the above conventional direct injection internal combustion engine, there is no consideration about an improvement of a smoke property in which the smokes occurred due to the combustion of the internal combustion engine can be reduced.

SUMMARY OF THE INVENTION

An object of the present invention is to provide a direct injection internal combustion engine controlling apparatus wherein, by assuring a low fuel consumption operation according to an operation under an extremely lean air-fuel ratio (A/F) condition which is a specific characteristic of a direct injection internal combustion engine, a compatibility of important characteristics can be realized with a high level. The above stated important characteristics are an improvement of a combustion stability property of the internal combustion engine and an improvement of a smoke property of the internal combustion engine.

Another object of the present invention is to provide a fuel controlling apparatus of a direct injection internal combustion engine and a fuel controlling apparatus of a vehicle having a direct injection internal combustion engine wherein a combustion stability property of the internal combustion engine and the vehicle having the internal combustion engine can be improved.

A further object of the present invention is to provide a fuel controlling apparatus of a direct injection internal combustion engine and a fuel controlling apparatus of a vehicle having a direct injection internal combustion engine wherein smoke produced by combustion in the internal combustion engine can be reduced remarkably.

According to the present invention, the above stated objects are attained by selecting a stratification combustion area, a homogeneous combustion area and an intermediate combustion area in the direct injection internal combustion engine according to the operation condition. The intermediate combustion area is formed at an intermediate portion of the above stated stratification combustion area and the homogeneous combustion area of the direct injection internal combustion engine.

In the direct injection internal combustion engine controlling apparatus, as the operation condition discriminating feature for discriminating the combustion condition of the internal combustion engine, a concentration of smoke exhausted from the internal combustion engine or a dispersion in the cylinder every an explosion stroke each of the internal combustion engine is employed.

In the direct injection internal combustion engine controlling apparatus, as the operation condition discriminating feature for discriminating the output condition of the internal combustion engine, a deviation value between a target torque value and an actual torque value is employed.

In the direct injection system internal combustion engine controlling apparatus, as a result obtained by the operation condition discriminating feature for discriminating the operation condition of the internal combustion engine, using indexes for indicating a stability degree of the operation condition which comprises a first predetermined value and a second predetermined value which is larger than the first predetermined value, when the index for indicating the stability degree of the operation condition is smaller than the predetermined value, stratification combustion is made, and when the index for indicating the stability degree of the operation condition is larger than second predetermined value, homogenous combustion is made.

In the direct injection internal combustion engine controlling apparatus, when a judgment result value of the operation condition judgment is more than a predetermined value, in a transfer of each combustion among stratification combustion, homogenous combustion or intermediate combustion, during a predetermined transfer, an allocation rate of the homogenous combustion and the stratification combustion is changed gradually.

Namely, the above stated objects can be attained by in a direct injection internal combustion engine controlling apparatus having things for controlling a fuel injection amount and a fuel injection timing of fuel which is supplied to a direct injection internal combustion engine, a combustion controlling feature for controlling the fuel to a homogenous combustion area for injecting the fuel in a respective cylinder during an intake stroke of the internal combustion engine, a stratification combustion area for injecting the fuel in the respective cylinder during a compression stroke of the internal combustion engine, and an intermediate combustion area which is a combustion area between the homogenous combustion area and the stratification combustion area and for injecting dividingly the fuel at a predetermined rate during the respective intake stroke and the respective compression stroke.

The direct injection internal combustion engine controlling apparatus has further an operation discrimination feature for discriminating an operation condition in accordance with at least one selected from a combustion condition of the internal combustion engine, an output condition of the internal combustion engine and an acceleration condition of a vehicle, and a selection feature for selecting at least one selected from homogenous combustion, stratification combustion and intermediate combustion in accordance with a result of the operation condition discrimination.

BRIEF DESCRIPTION OF DRAWINGS

Other objects, advantages and novel features of the present invention will become apparent from the following detailed description of the invention when considered in conjunction with the accompanying drawings wherein:

FIG. 5 is a graph showing a characteristic example of a direct injection internal combustion engine controlling apparatus;

FIG. 6 is an explanatory chart for explaining the basic performance of a direct injection internal combustion engine controlling apparatus;

DETAILED DESCRIPTION OF THE DRAWINGS

Figure 1:
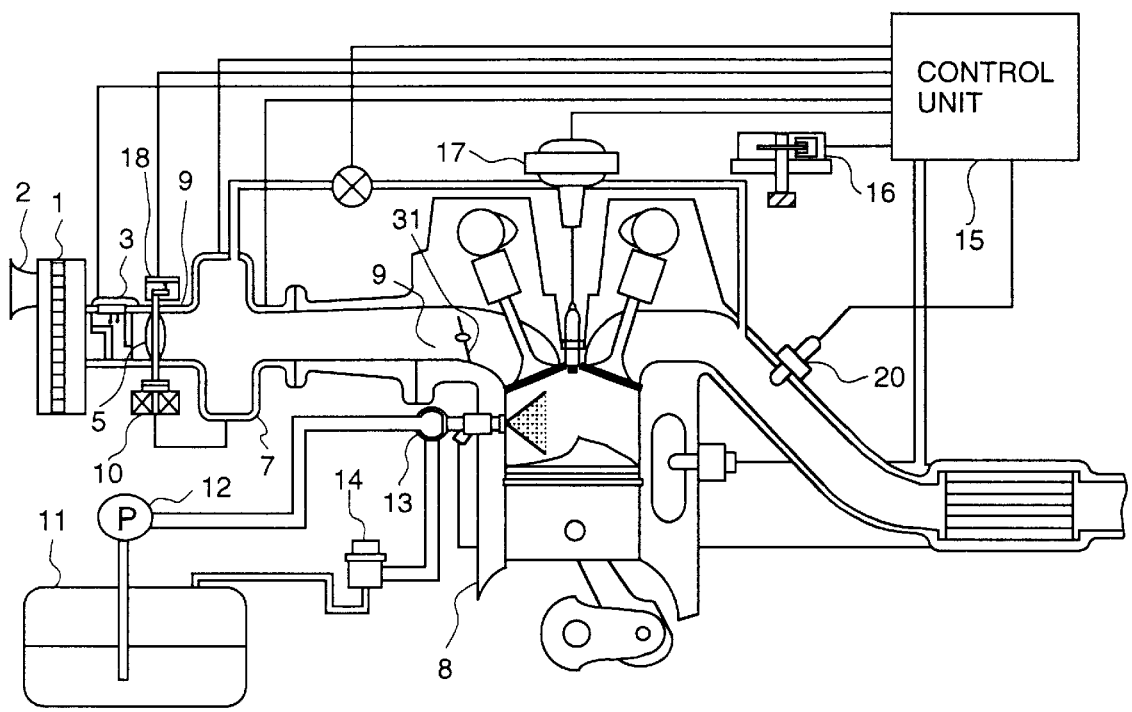
FIG. 1 is a schematic view showing one engine system having a direct injection internal combustion engine controlling apparatus according to the present invention.

In FIG. 1, air is taken in by an engine 8 from an inlet port of an air cleaner 1 and passes through a throttle valve body 6 on which a throttle valve 5 for control an intake air flow amount is provided and then enters into a collector 7. Herein, the throttle valve 5 is connected to a motor 10 which drives the throttle valve 5, and by driving the motor 10 the throttle valve 5 is operated and the intake air flow amount in the engine 8 is controlled.

The intake air reaching the collector 7 is distributed to a respective intake manifold pipe 9 which is connected to a respective cylinder of engine 8 and the air is introduced into the respective cylinder. In this intake manifold pipe 9, a SCV (swirl control valve) 31 is provided on the respective cylinder and in the SCV the intake air is given a deflection force. In the respective cylinder of the engine 8, the air being given the deflection force is mixed with an atomized fuel.

From a fuel tank 11 a fuel such as gasoline is sucked and pressurized by a fuel pump 12, and this fuel is supplied to a fuel system in which a fuel injector 13, a fuel pressure regulator 14 are arranged. After that, the fuel is controlled at a predetermined pressure value by the fuel pressure regulator 14, and the regulated fuel is injected to the respective cylinder of the engine 8 from the fuel injector 13 which can open at a fuel injection port to the respective cylinder. Further, from an air flow meter 3 a signal indicating the intake air flow amount is outputted, and this signal is inputted into a control unit 15.

Further, a throttle valve sensor 18 is provided on the throttle valve body 6, and this sensor 18 detects an opening degree of the throttle valve 5. An output of this sensor 18 is also inputted into the control unit 15.

The engine system of the direct injection system internal combustion engine controlling apparatus according to the present invention comprises an optical system crank angle sensor 16, and this sensor 16 is driven rotatively by a cam shaft and outputs a signal indicating a rotational position of a crank shaft with an accuracy of at least 2–4° degree. The signal relating to the rotational position of the crank shaft is also inputted into the control unit 15. Using these various signals, an injection timing of the fuel and an ignition timing of an ignitor are controlled.

The above described engine system also comprises an air-fuel ratio sensor (A/F sensor) 20, this A/F sensor 20 being provided on an exhaust pipe and detecting and outputting an actual operation air-fuel ratio (A/F) according to components of the exhaust gas. This signal is also inputted into the control unit 15 similarly to the above described various other signals.

As stated above, the control unit 15 in the signals from the various sensors for detecting the operation condition of the engine 8 and carries out a predetermined execution processing. As a result of the execution, the control unit 15 further outputs the executed various control signals and also output a respective predetermined control signal to the fuel injector 13, an ignition coil 17 and the motor 10 for operating the throttle valve 5. The control unit 15 also carries out a fuel supply control, an ignition timing control, and an intake air flow amount control.

Figure 2:
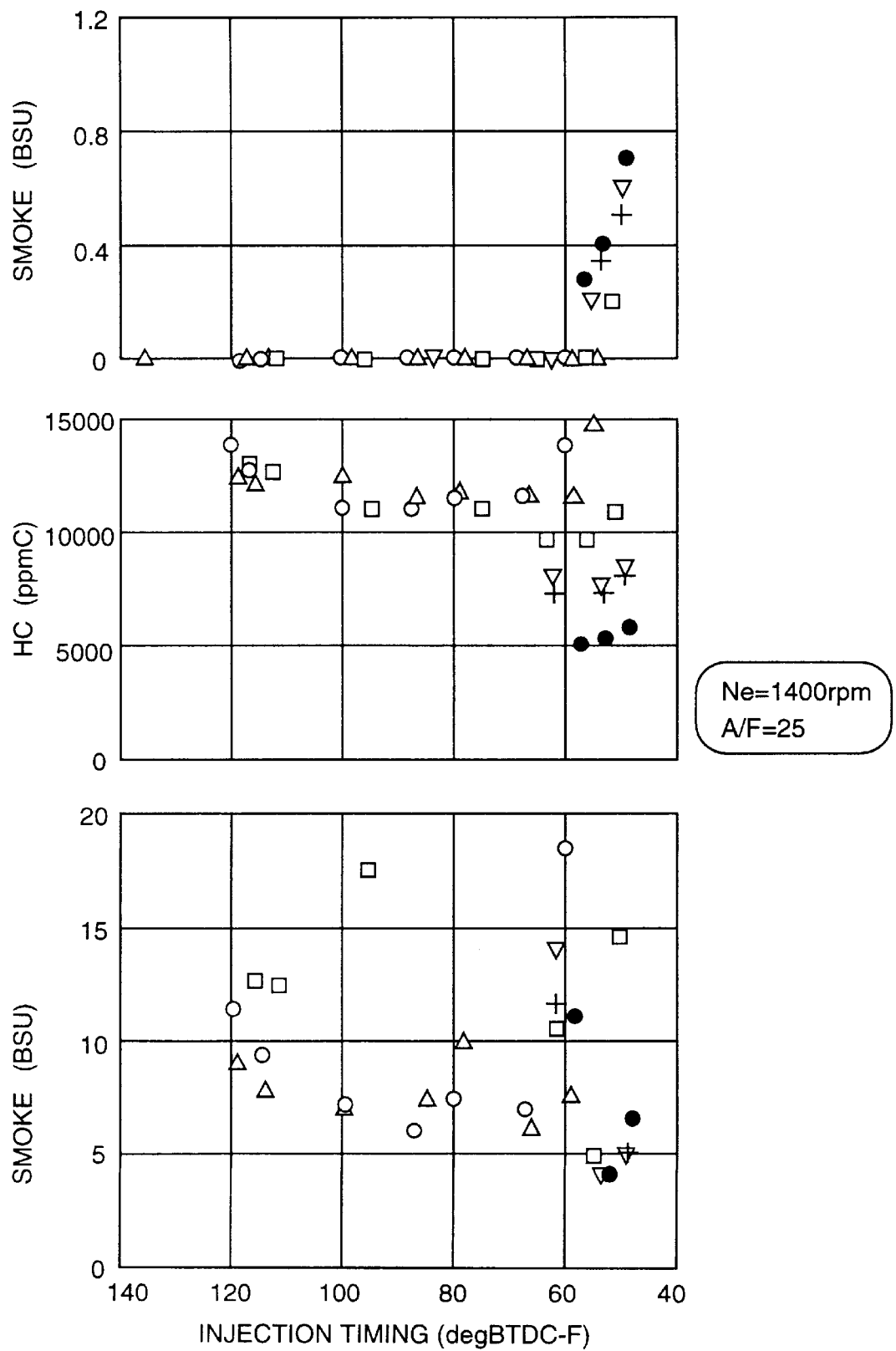
FIG. 2 is a graph showing a characteristic example of a direct injection internal combustion engine controlling apparatus as seen in FIG. 1.

In the above described engine system, the characteristics of the engine are shown in FIG. 2 in which the air-fuel ratio (A/F) of a mixture air to be combusted is set to a lean condition under a stoichiometric air-fuel ratio ((A/F)○).

In this example of the direct injection internal combustion engine controlling apparatus, the engine 8 is operated at the lean condition of the air-fuel ratio having 25 (A/F=25) under at a constant torque and under a constant engine rotation number (Ne=1400 rpm). Further, the load conditionis called a road-load condition. The load conditions shown in FIG. 3, FIG. 7 and FIG. 8, etc. are the same conditions as shown in FIG. 2, except as noted.

The example of the direct injection internal combustion engine controlling apparatus in FIG. 2 shows engine performance under homogeneous combustion. It is understood that in accordance with the injection timing of the fuel, "CPi" indicating a combustion stability property of the engine is changed. Further, the engine is affected by an HC property and a smoke property, in particular since the smoke increases abruptly or the smoke property becomes bad abruptly when the finish of fuel injection is delayed from BTDC 60°, it is necessary to operate in an area in which the smoke property is lower than 0.5. This value is an allowance limitation value of the smoke, in other words a target value of the smoke property is less than 0.5.

Figure 3:
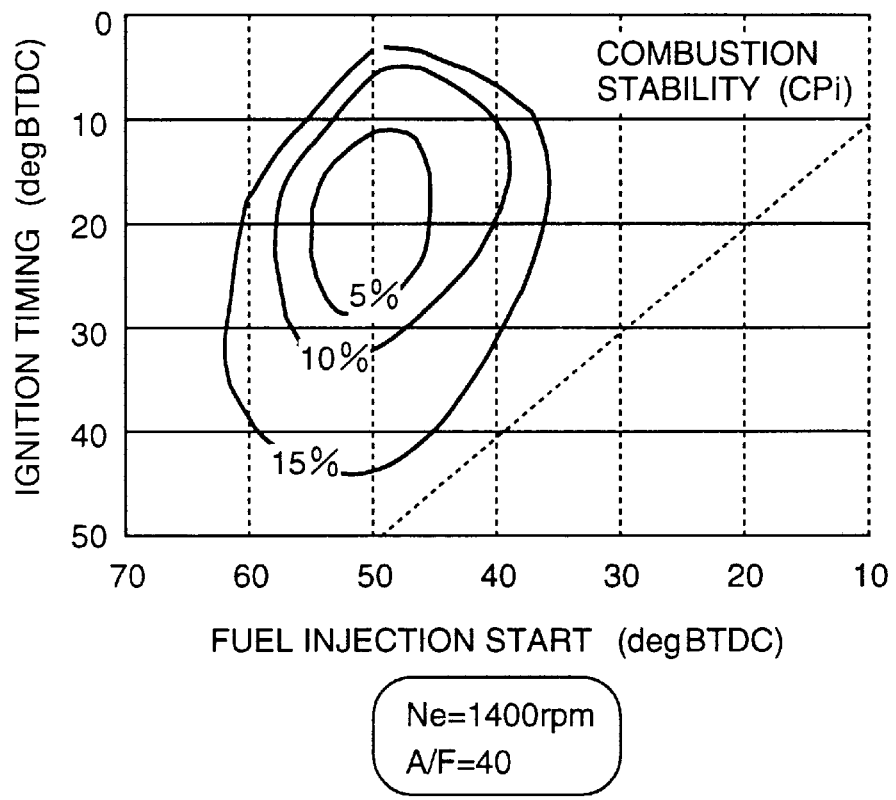
FIG. 3 is a graph showing a characteristic example of a direct injection internal combustion engine controlling apparatus.
Figure 4:
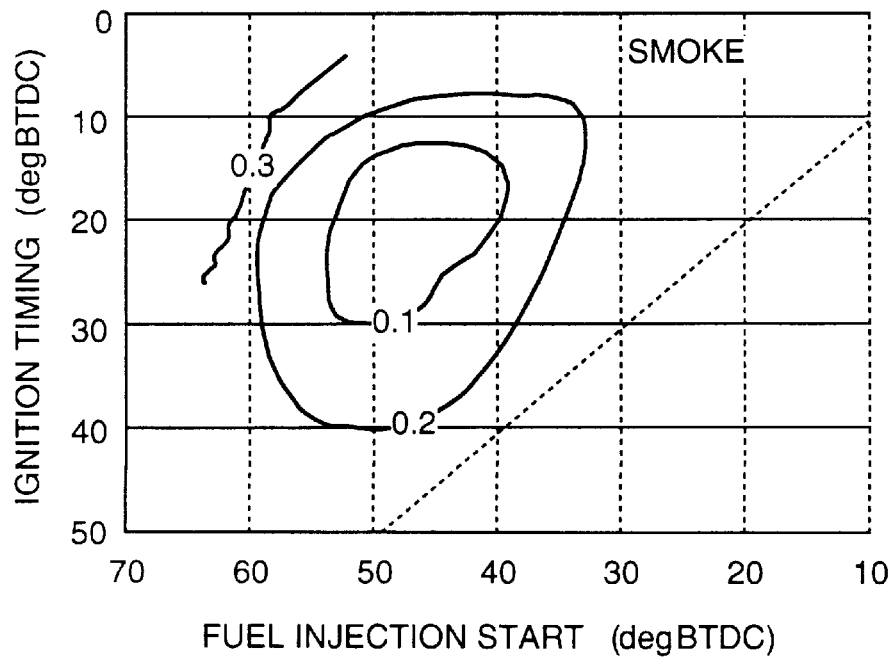
FIG. 4 is a graph showing a characteristic example of a direct injection internal combustion engine controlling apparatus.

Next, FIG. 3 and FIG. 4 are measurement examples of the engine performances under a stratification combustion condition of the direct injection internal combustion engine controlling apparatus. In these figures, by varying the respective injection timing of the fuel and the ignition timing of the ignitor, the combustion stability property "CPi" and the smoke property have been measured. In both FIG. 3 and FIG. 4, a dotted linear line shows a portion where the fuel injection and the ignition are carried out at the same time.

At the condition under the air-fuel ratio of 40 (A/F=40), the operation condition of the engine has a target value of the combustion stability property "CPi", which is a range of less than 0.5%, and this value of 0.5% is an allowance limitation value of the combustion stability property "CPi" also the target value of the smoke property, which is less than 0.5, can be cleared, (for example a portion of the injection start timing of 50° and the ignition timing of 20°).

However, at the actual operation condition of the engine, the circumstances shown in FIG. 5 occur. Further, this figure what occurs by keeping both the rotation speed (Ne) and the intake air amount of the engine 8 constant, the supplied air-fuel ratio is changed from 40 (A/F=40) to 14.7 ((A/F)○=14.7; λ=1). In this figure, ○ mark indicates the stratification combustion condition (the compression stroke fuel injection) and ● mark indicates the homogeneous combustion condition(the intake stroke fuel injection). As a result, as shown an upper stage in FIG. 5, a need exists to improve the smoke property.

Firstly, in FIG. 5, with respect to the smoke at an upper stage, the smoke is substantially zero under homogeneous combustion stratification combustion during an air-fuel ratio of 20–40 (A/F=20–40) there are portions in which the value of the smoke property exceeds 0.5.

On the other hand, the "surge torque property" indicating the combustion of the engine at a lower half in FIG. 5 exceeds a target value of 0.8 kgf-m under both stratification combustion and homogeneous combustion each having an air-fuel ratio is in the vicinity of 20 (A/F≈20).

As a result, as shown at the lower half in FIG. 5, it is necessary to improve the surge torque property. The dispersion in the surge torque is caused by the dispersion of the pressure in the cylinder during every the explosion stroke.

FIG. 6 provides a summarized conception about the respective characteristics of the homogeneous combustion condition, the stratification combustion condition and a weak stratification combustion condition. The weak stratification combustion condition is intermediate the homogeneous combustion condition and the stratification combustion condition. The injection of the fuel under homogeneous combustion is carried out during the engine intake stroke and the injection of the fuel under the stratification combustion is carried out during the engine compression stroke.

Further, the combustion is stable because the engine structure is designed to obtain the most suitable structure for the stratification combustion, i.e. at the stratification combustion condition it lowers largely the target value of the combustion stability property "CPi" of 5%, and then a stable combustion condition exists. However, at homogeneous combustion, the combustion stability property "Cpi" having the value of 10% degree under the air-fuel ratio A/F of 20–25 (A/F=20–25 exists).

On the other hand, as to the smoke property, under the homogeneous combustion condition the smoke become substantially zero; however, under the stratification combustion, it is generally recognized that it is very difficult to make the smoke zero. Next, as to the reduction of the fuel consumption which is one object for forming stratification combustion, under homogeneous combustion it is 200 g/psh at a maximum, whereas under stratification combustion it can attain 180 g/psh which is substantially the stoichiometric consumption value.

In FIG. 6, in the right-hand column, weak stratification combustion is summarized. The weak stratification combustion is an intermediate combustion method, and this weak stratification combustion is able to obtain the merits of the both of the homogenous combustion and the stratification combustion at a maximum.

As shown in the right-hand column in FIG. 6, in accordance with the employment of weak stratification combustion, then high stability of the stratification combustion smoke in the homogenous combustion, and further the low fuel consumption percentage in the homogenous combustion can all be expected.

In other words, by taken into consideration objects or the results of the actual facts of the engine structure, and by combining with the above three combustion methods, i.e. homogenous combustion, stratification combustion and weak stratification combustion, desirable combustion in the direct injection internal combustion engine near to the ideal combustion can be achieved.

Figure 7:
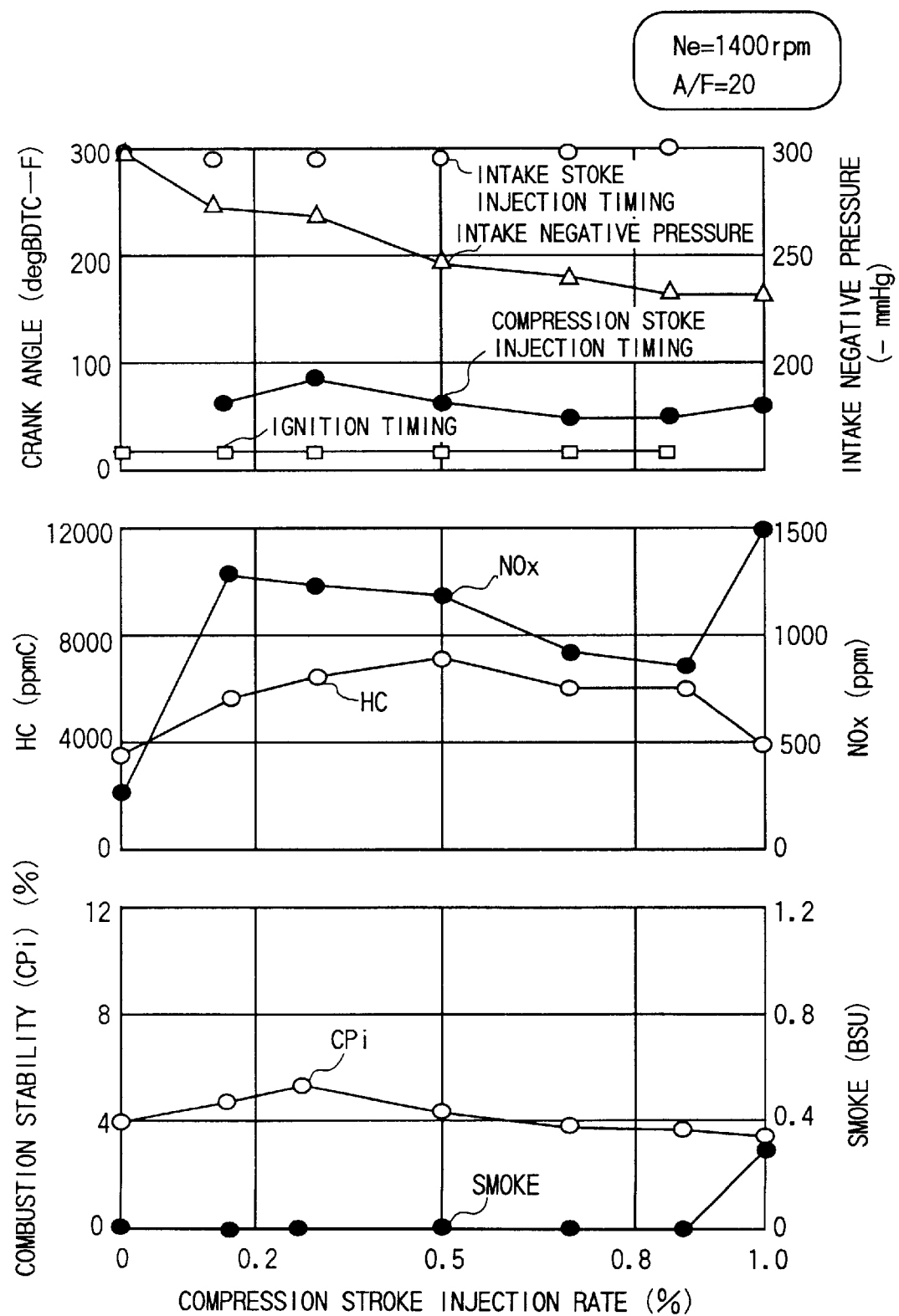
FIG. 7 is a graph for explaining the basic performance of a direct injection internal combustion engine controlling apparatus.
Figure 8:
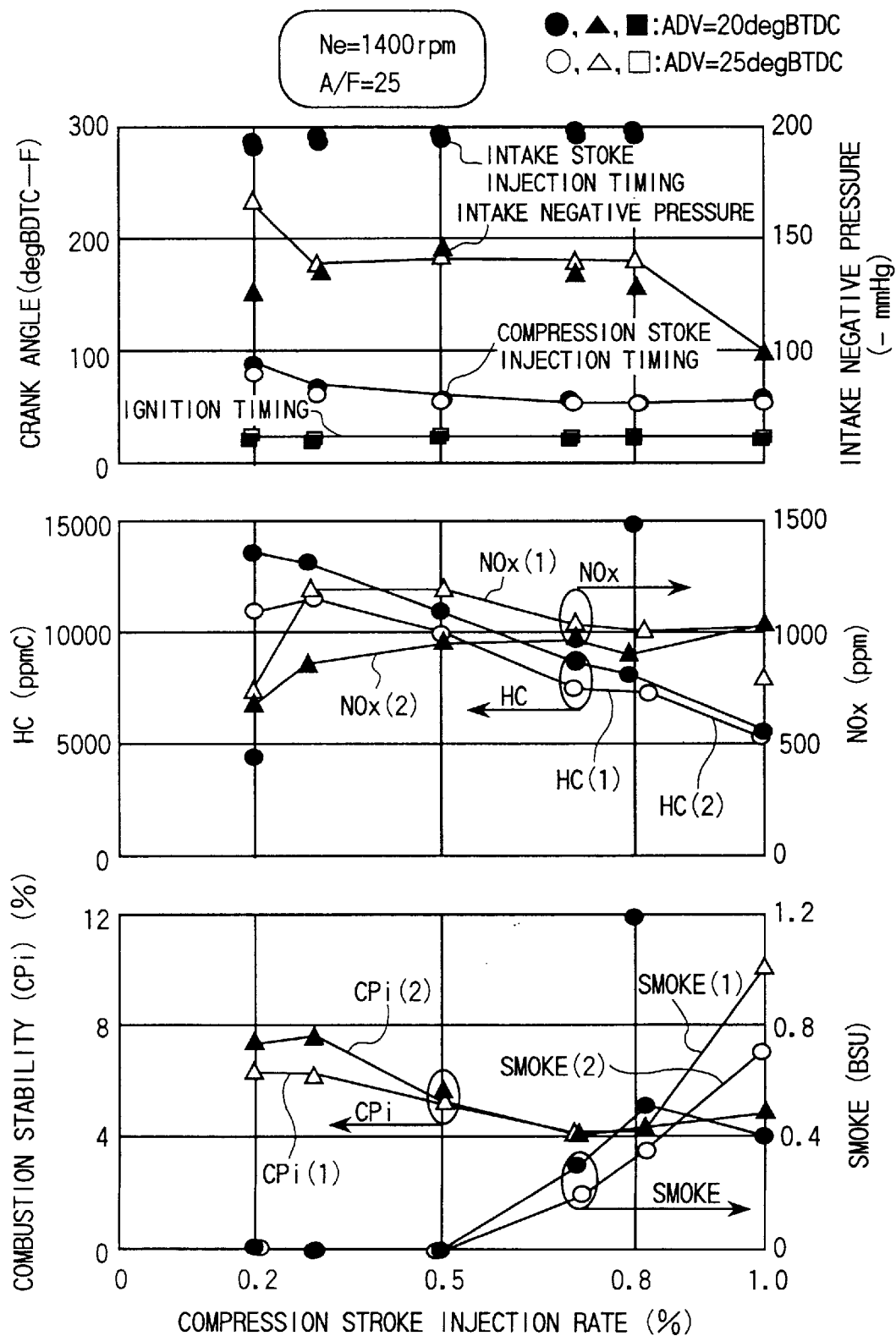
FIG. 8 is a graph for explaining the basic performance of a direct injection internal combustion engine controlling apparatus.

FIG. 7 and FIG.of the weak stratification combustion which is the intermediate combustion area. FIG. 7 is the measurement result of the air-fuel ratio of 20 (A/F=20) and FIG. 8 is the measurement result of the air-fuel ratio of 25 (A/F=25). In these figures, the compression stroke fuel injection rate, namely a rate of the stratification combustion area, is indicated at the horizontal axis shows and the data concerning the combustion stability property (CPi) and the smoke property are shown on the vertical axis.

In FIG. 8, two measurement results of the combustion stability properties indicated by curve lines of CPi(1) and CPi(2) and two measurement results about the smoke properties indicated by curve lines SMOKE(1) and SMOKE(2) are shown in a lower diagram. Further, two measurement results about HC properties indicated by curve lines of HC(1) and HC(2) and two measurement results about NOx properties indicated by curve lines NOx(1) and NOx(2) are shown in the middle diagram.

As understood from FIG. 7 and FIG. 8, the combustion stability property (CPi) does not chance very much (the combustion stability property (CPi) hardly changes); however, the smoke property has a tendency to increase more when the rate of the stratification combustion becomes higher. Accordingly, by controlling the rate between the stratification combustion and the homogeneous combustion the combustion performance near the ideal combustion can be obtained.

In other words, during one combustion cycle, the fuel is dividingly infected two times during the intake stroke and during the compression stoke or the fuel is dividingly injected during the intake stroke and the fuel is dividingly infected during the compression stoke, respectively and further the rate between the stratification combustion and the homogeneous combustion is varied, such that the combustion performance near the ideal can be obtained.

Figure 9:
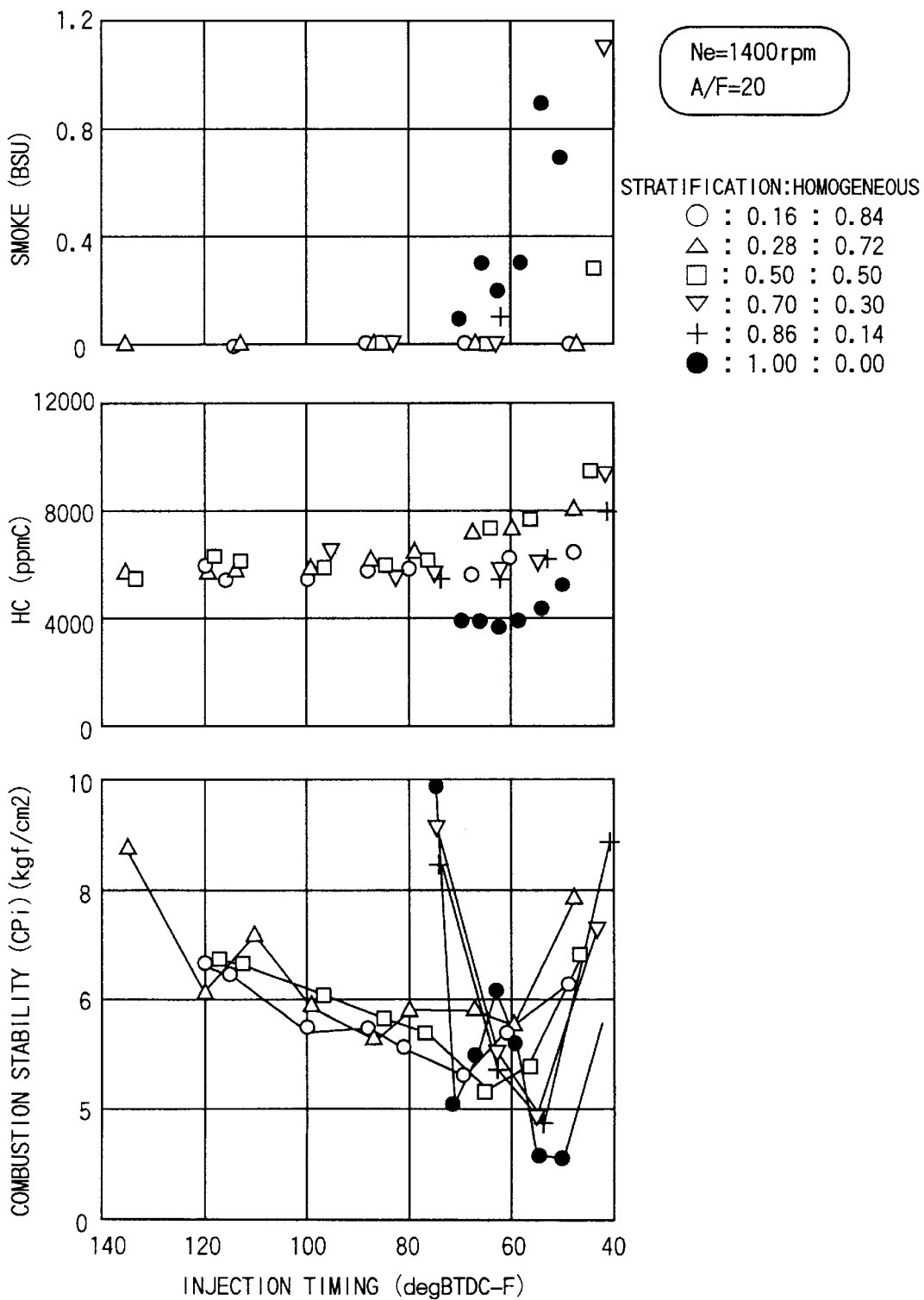
FIG. 9 is a graph for explaining the basic performance of a direct injection internal combustion engine controlling apparatus.

FIG. 9 shows a measurement result of the engine performance at a condition the air-fuel ratio of 20 (A/F=20) at the constant rotation number (Ne=1400 rpm ) according to the injection timing by varying the rate between the stratification combustion and the homogeneous combustion. As shown at a right upper portion in FIG. 9, the rate between the stratification combustion and the homogeneous combustion is varied with six rates in this example.

It can be confirmed that when the fuel rate between the stratification combustion and homogeneous combustion is changed, the combustion stability property (Cpi), the HC property, and the smoke property are changed.

Hereinafter, other embodiments of the direct injection internal combustion engine controlling apparatus according to the present invention will be explained.

Figure 10:
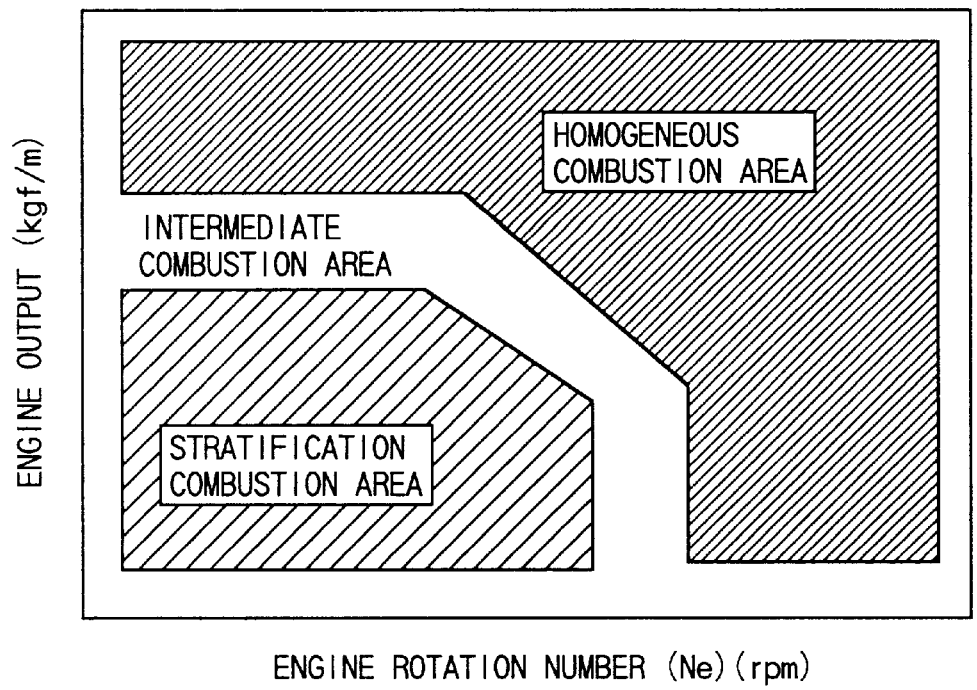
FIG. 10 is an explanatory view showing one embodiment of a direct injection internal combustion engine controlling apparatus according to the present invention.

FIG. 10 shows a setting map of the air-fuel ratio (A/F) of the direct injection system internal combustion engine with respect to the engine rotation number (Ne) and the engine output. The stratification combustion area covers low rotation number and the low load, and on the other hand, the homogenous combustion area covers high load. Between the stratification combustion area and the homogenous combustion area, there is the intermediate combustion area (the weak stratification combustion area).

Figure 11:
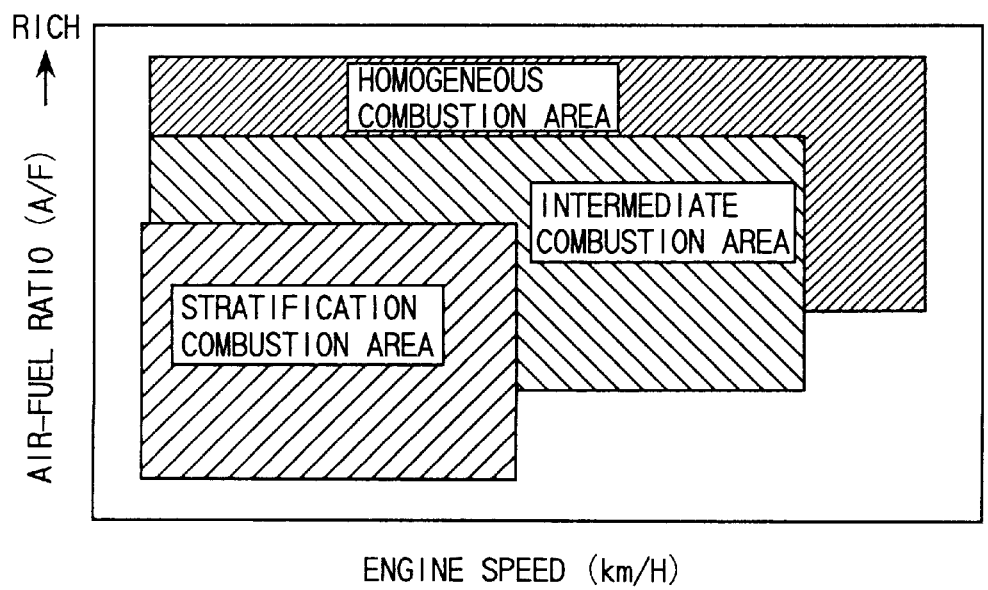
FIG. 11 is an explanatory view showing another embodiment of a direct injection internal combustion engine controlling apparatus according to the present invention.

In FIG. 11, the vehicle speed is indicated on the horizontal axis and the air-fuel ratio (A/F) is indicated on the vertical axis, to clearly make a control image for the direct injection internal combustion engine. As shown in FIG. 11, to perform a control for the direct injection internal combustion engine, there are three combustion areas, namely the stratification combustion area, the homogenous combustion area, and the intermediate combustion area (the weak stratification combustion area) in accordance with the size of the air-fuel ratio (A/F) and the vehicle speed.

Figure 12:
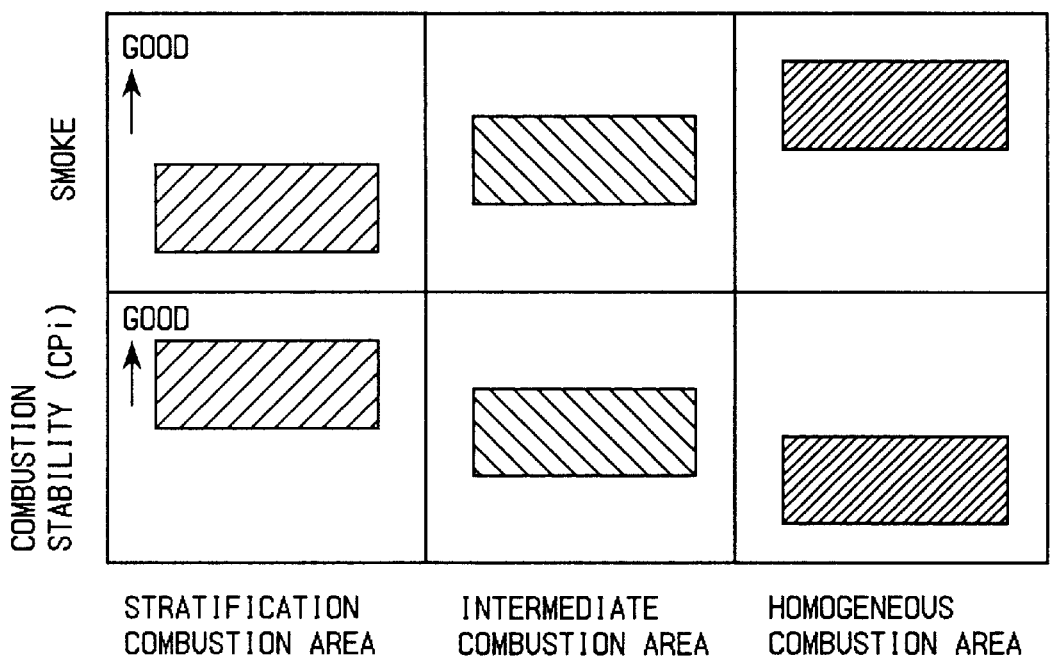
FIG. 12 is an explanatory view showing yet another embodiment of a direct injection system internal combustion engine controlling apparatus according to the present invention.

In FIG. 12, the various combustion areas are shown on the horizontal axis and the combustion stability property (CPi) and the smoke property are shown on the vertical axis. Using this figure, the characteristics of three combustion areas are shown in accordance with the combustion stability property (CPi) and the smoke property and further this figure is arranged to demonstrate the characteristics of each combustion condition which have been explained in FIG. 6.

Figure 13:
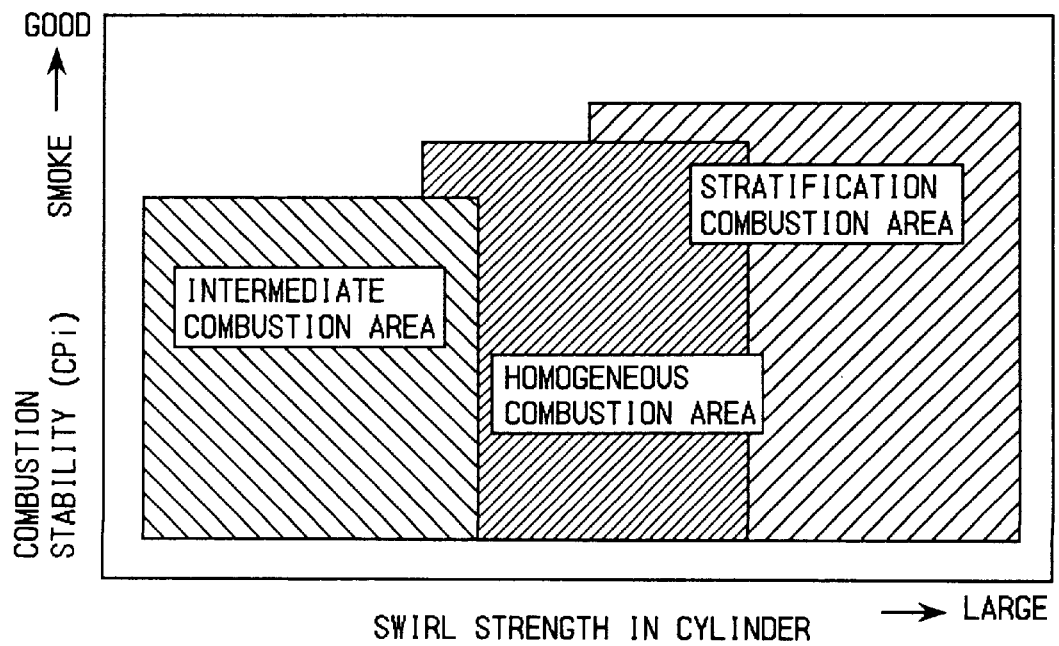
FIG. 13 is an explanatory view showing still another embodiment of a direct injection internal combustion engine controlling apparatus according to the present invention.

In FIG. 13, the swirl strength in the cylinder of the engine is shown on the horizontal axis and the property are shown on the vertical axis. Using this figure, the swirl control valve (SCV) 31 in FIG. 1 will now be explained .

In the stratification combustion area, to improve the robust property of the combustion, it is generally desirable to increase the gas fluidity (the strength of the swirl) in the cylinder of the engine. Further, during the homogeneous combustion, to obtain the stable combustion, the gas fluidity is considered a very important factor. As a result, the control of the size of the gas fluidity is an important factor in the success or failure for the fuel control of the direct injection internal combustion engine.

Hereinafter, various embodiments of the control of the size of the gas fluidity in the direct injection internal combustion engine according to the present invention will be explained.

Figure 14:
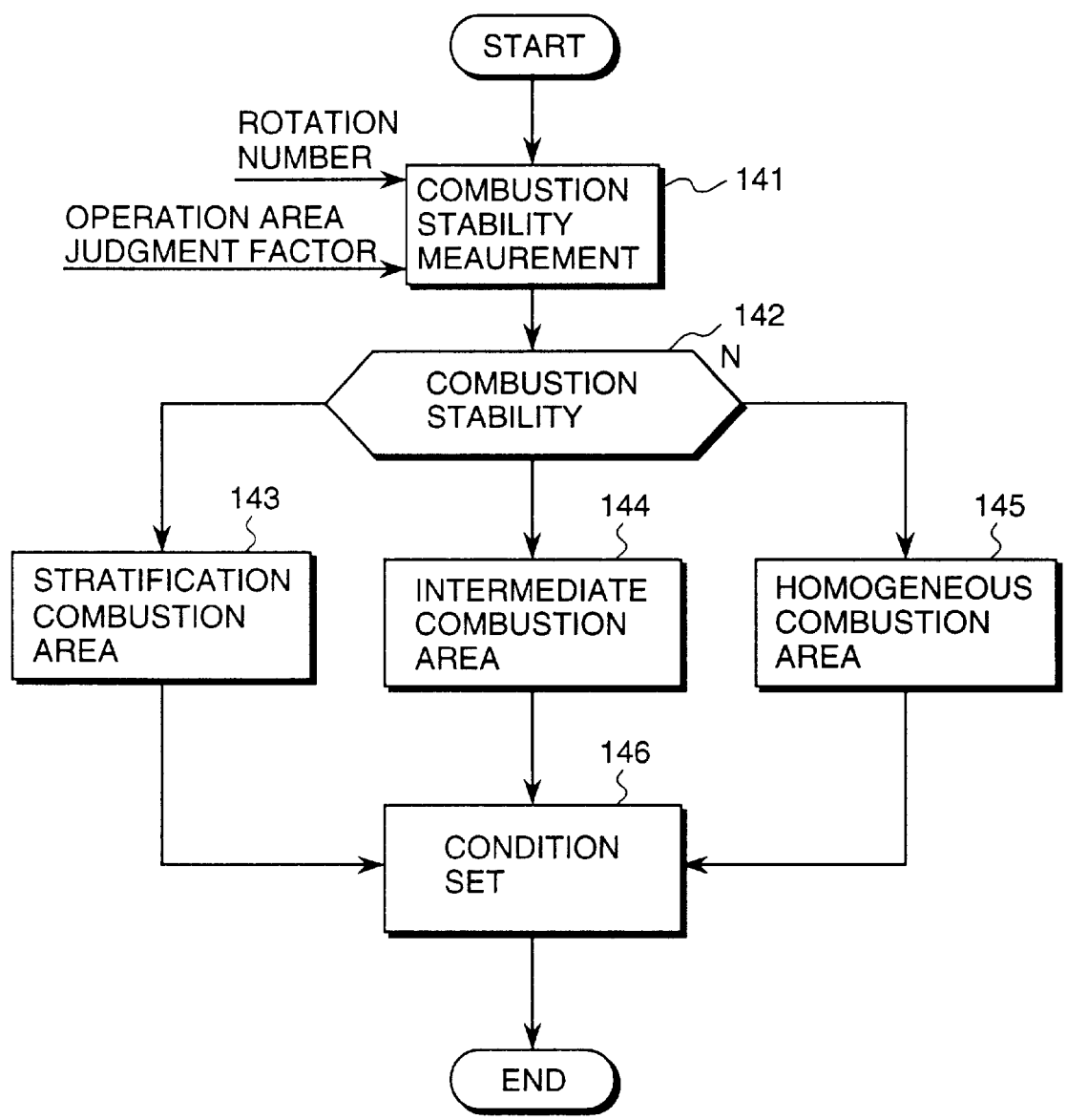
FIG. 14 is a flow chart showing one embodiment of a direct injection internal combustion engine controlling apparatus according to the present invention.

FIG. 14 is a control flow chart showing a basic conception of a selection of the stratification combustion area, the homogeneous combustion area and the intermediate combustion area. In step 141, the combustion stability property of the engine is detected through a change in the rotation speed of the engine and a fluctuation in the engine combustion pressure etc.

In step 142, the existence of the combustion stability property within a standard value range is judged , and according to the circumstances the combustion stability property is determined. Namely, when the surge torque, etc. which are the indexes of the combustion stability property is larger than the standard value range, the stability of the engine combustion is regarded as important, and then the combustion stability property is moved to the stratification combustion area.

On the other hand, when the value of the surge torque, etc. which are the indexes of the combustion stability property is smaller than the standard value range, then the combustion stability property is moved to the homogeneous combustion area. Further, when the combustion stability property is within the standard value range, such circumstances are continued, i.e., the former circumstances are maintained.

In FIG. 14, the combustion stability property of the engine is regarded the judgment standard. On the other hand, FIG. 15 is a control flow chart showing the basic conception of the selection of the stratification combustion area, the homogeneous combustion area and the intermediate combustion area by paying attention to the smoke property.

The smoke generated from the engine directly detected through a sensor (for example, a combustion optical sensor, etc.); however, by detecting the change of the engine speed and the fluctuation in the engine combustion pressure, etc. estimate or judge in accordance with the factors which relate to a deterioration of the combustion condition (step 151).

Figure 15:
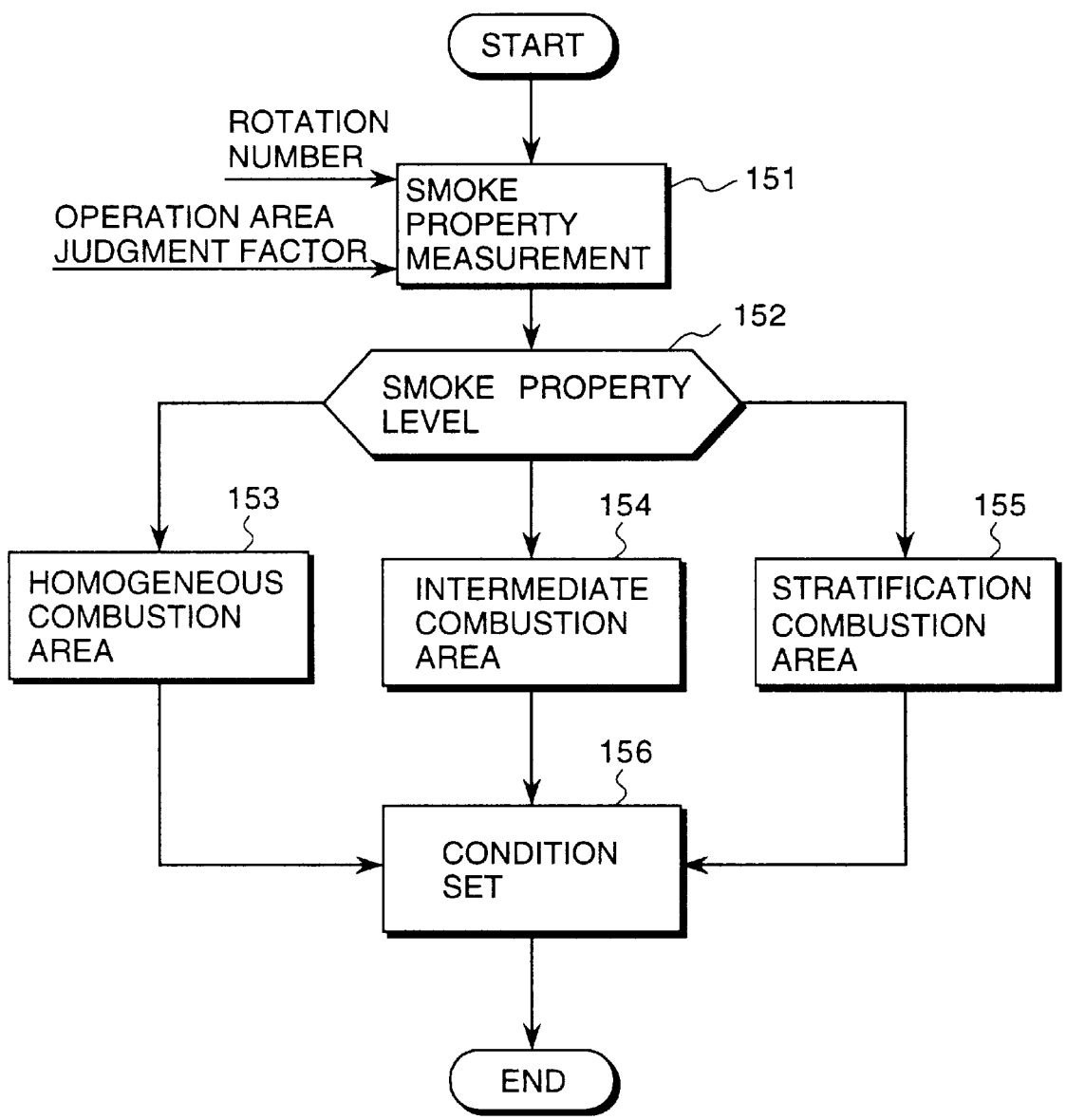
FIG. 15 is a flow chart showing a second embodiment of a direct injection internal combustion engine controlling apparatus according to the present invention.

In step 152 shown in FIG. 15, the existence of a smoke level within a standard value range is judged , and according to the circumstances when the smoke level is larger than the standard value range, the smoke property is regarded as important than the engine combustion property, and then the smoke property is moved to the homogeneous combustion area.

On the other hand, when the smoke property is smaller than the standard value range, then the smoke property is moved to the stratification combustion area. Further, when the smoke property is within the standard value range, such circumstances are continued, i.e., the former circumstances are maintained.

Figure 16:
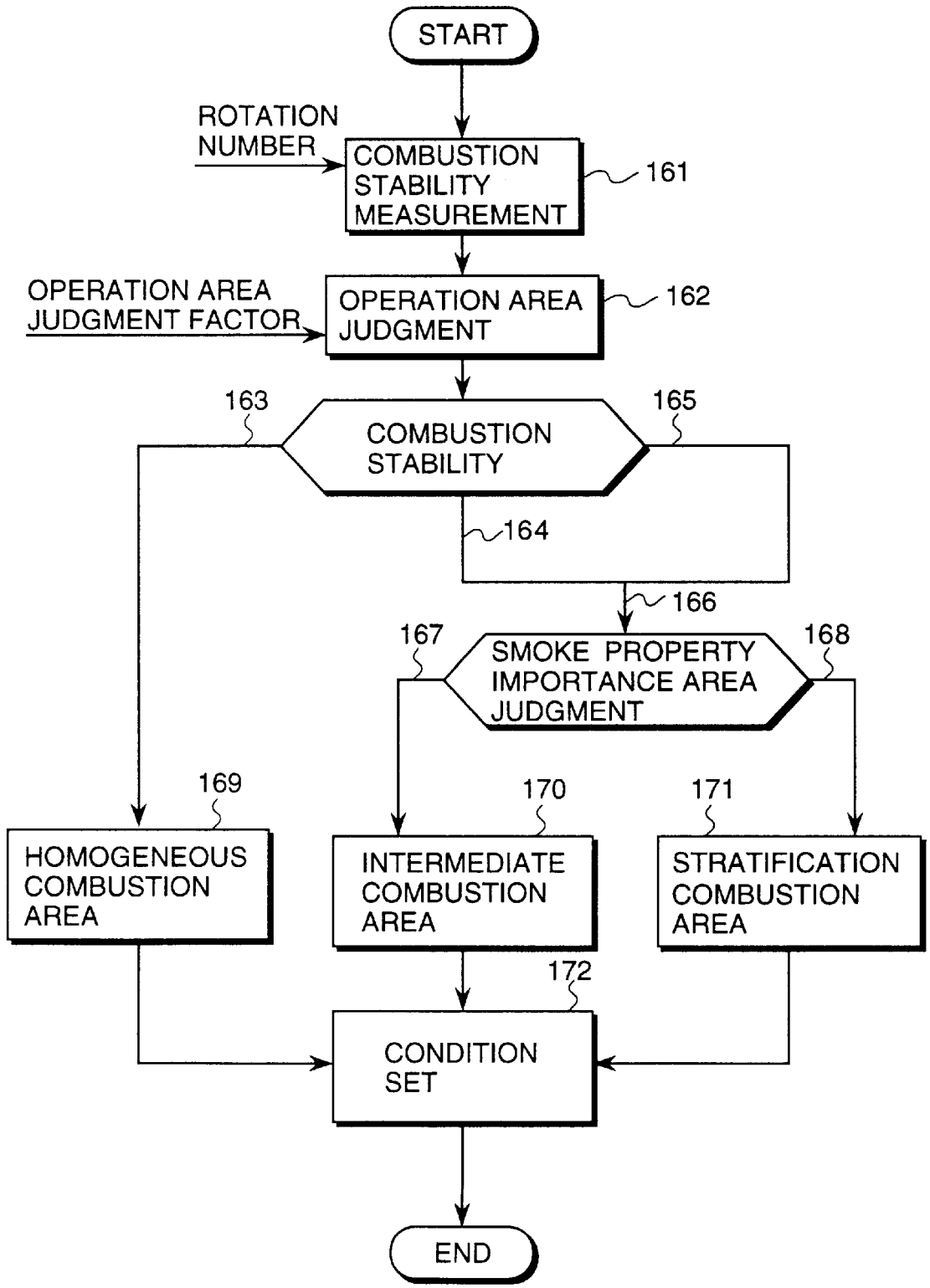
FIG. 16 is a flow chart showing a third embodiment of a direct injection internal combustion engine controlling apparatus according to the present invention.

FIG. 16 is a control flow chart in which both the engine combustion stability property and the smoke property become the judgment standards. Attention is paid to the fact that an area regarded as important for the engine combustion stability property differs from as area regarded as important for the smoke property. When there is no problem with the combustion stability property, the homogeneous combustion can be selected as shown in step 169.

On the other hand, when there is a problem with the combustion stability property (step 165), the stratification combustionis selected; however, in this case a required value of the smoke property is judged from the operation condition (step 166) and an allowable tolerance range is estimated.

When the smoke property are regarded as important , in a such case the stratification combustion area is employed as shown in step 171, but otherwise the intermediate combustion area (this is the two times injection control area as stated above) is employed as shown in step 170.

Figure 17:
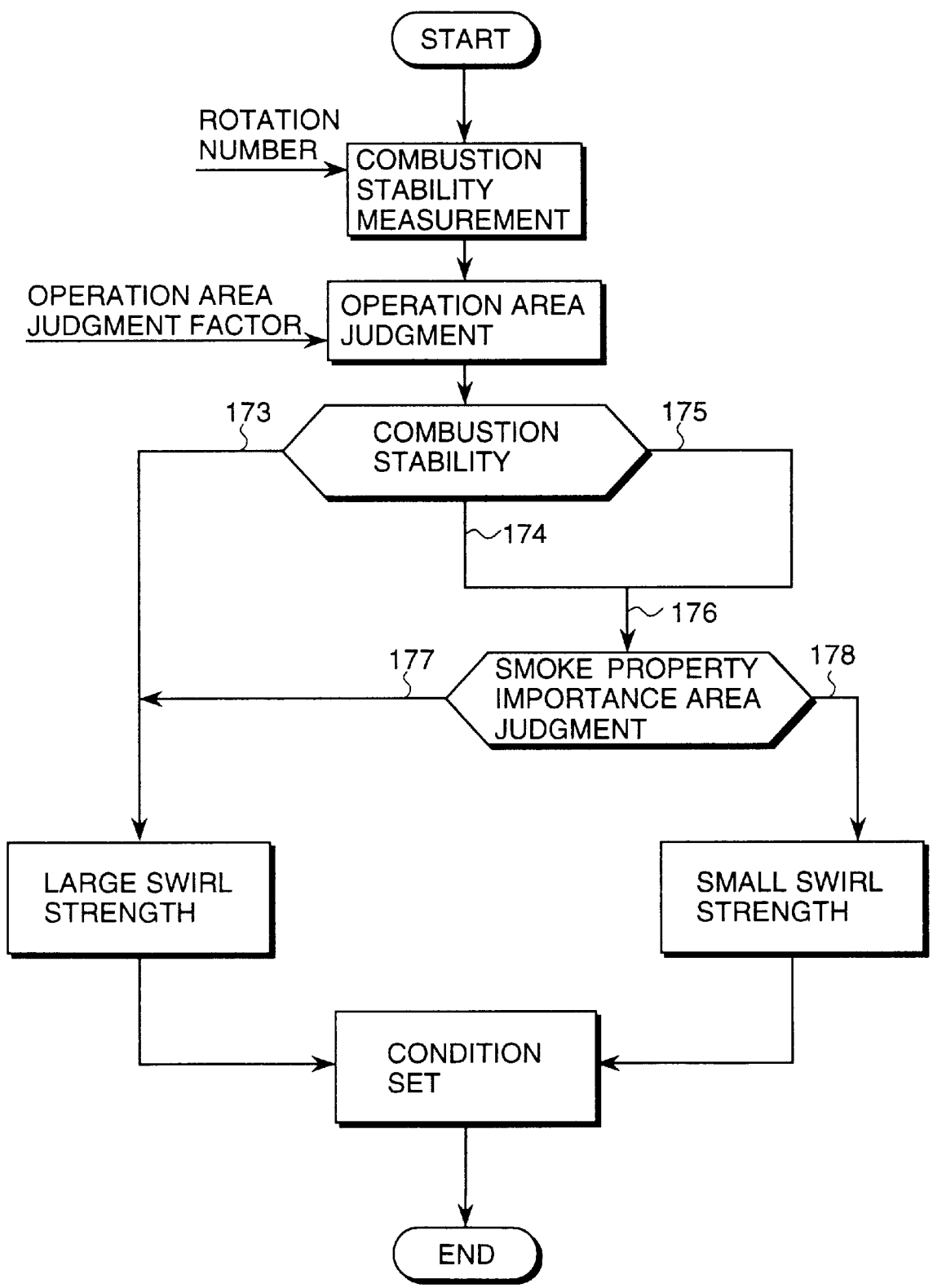
FIG. 17 is a flow chart showing a fourth embodiment of a direct injection internal combustion engine controlling apparatus according the present invention.

FIG. 17 shows a control flow chart where the combustion stability property is solved according to the strength of the gas fluidity which gives an affect to the cylinder of the engine. In other words, when there is bad combustion stability property (step 173), the swirl strength is increased and the combustion is stabilized.

When the combustion stability property, namely the surge torque etc. for indicating combustion stability , is small or within the standard value range and there is no problem with the stability of the combustion (step 174; step 175), the importance about the smoke property is judged and when the smoke property is not important (step 177), the swirl strength is increased.

On the other hand, when the importance about the smoke property is judged as important, with the circumstances near to homogeneous combustion than to intermediate combustion, the control where the swirl strength is small is selected.

Figure 18:
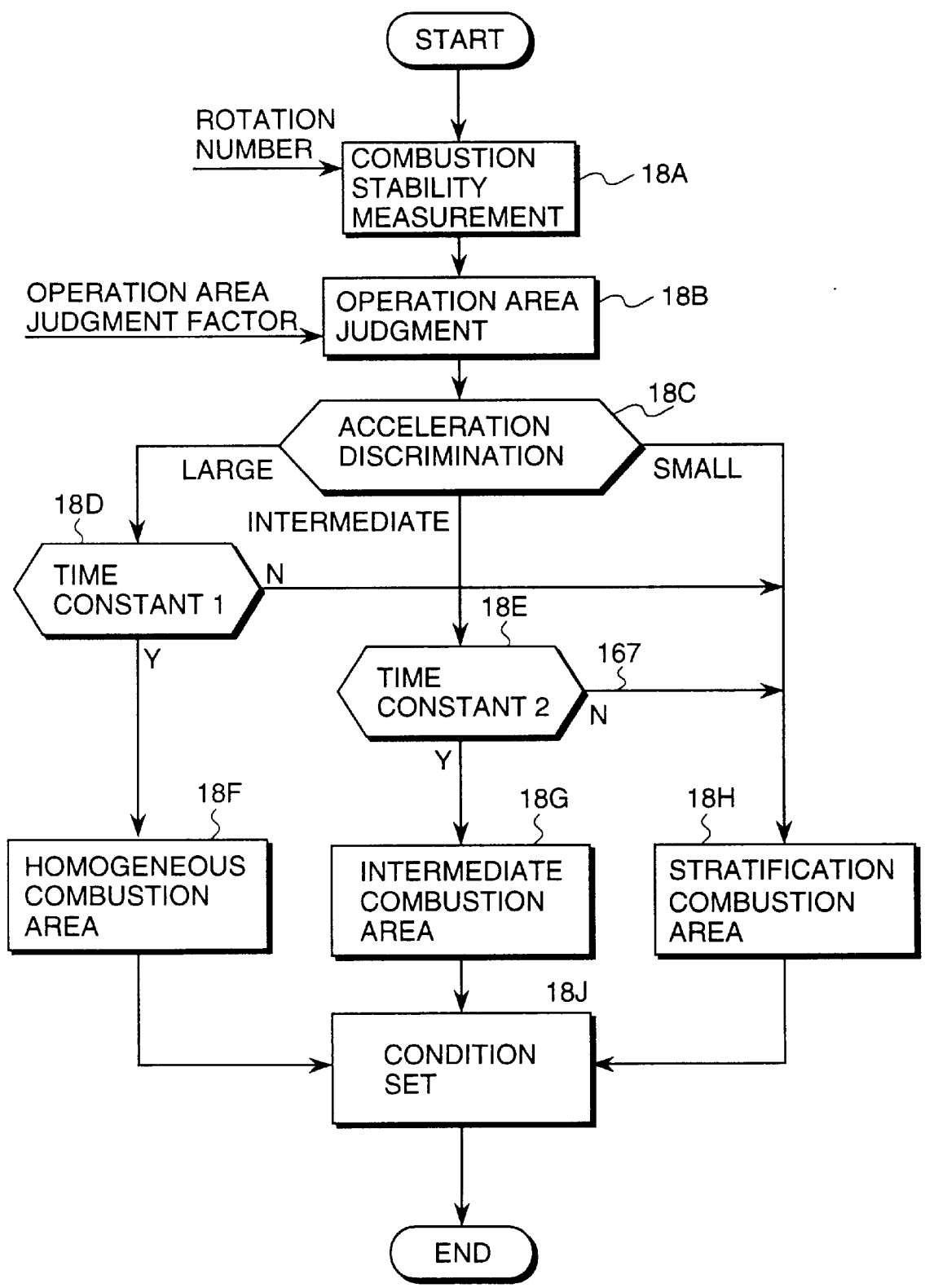
FIG. 18 is a flow chart showing a fifth embodiment of a direct injection internal combustion engine controlling apparatus according to the present invention.
Figure 19:
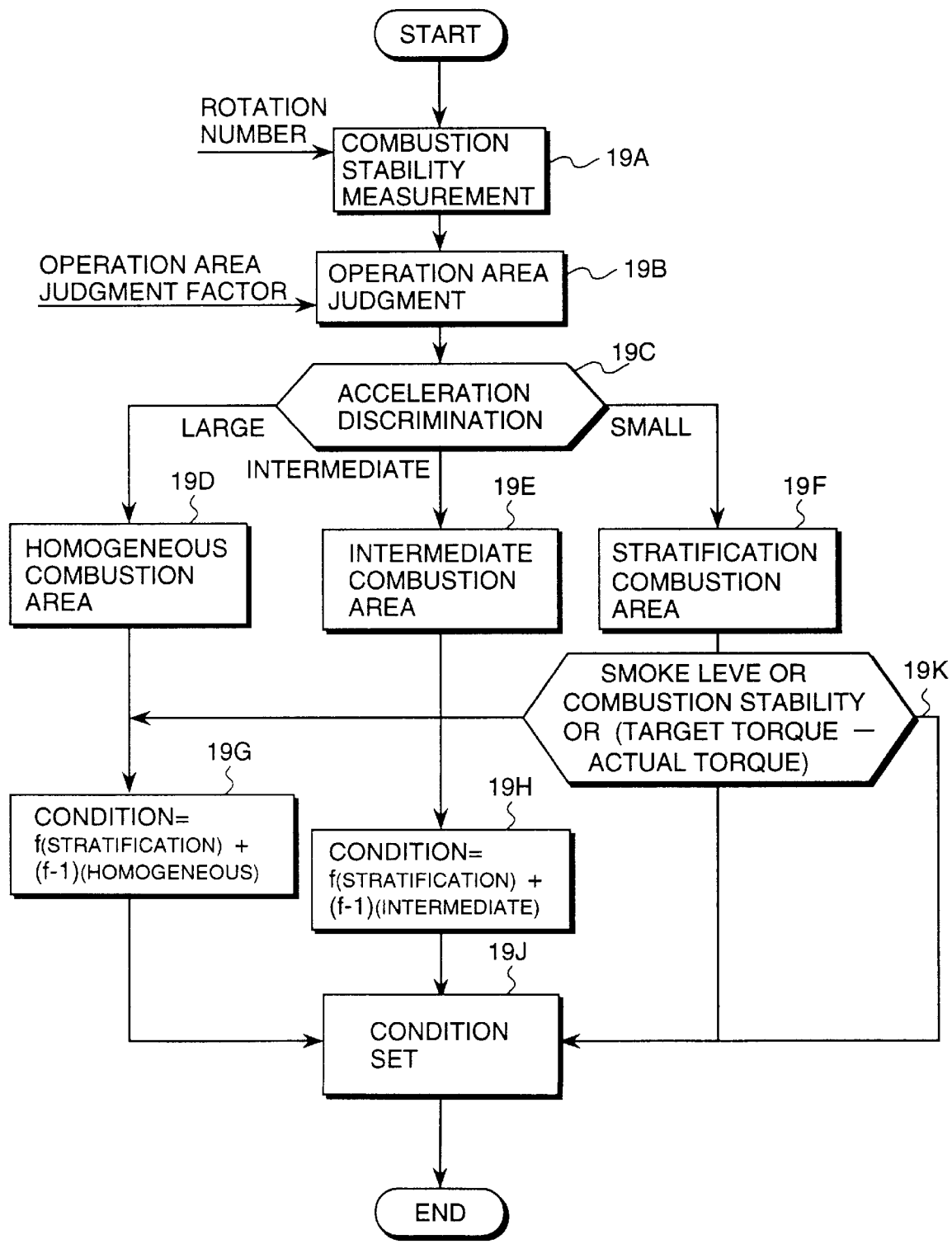
FIG. 19 is a flow chart showing a sixth embodiment of a direct injection internal combustion engine controlling apparatus according to the present invention.
Figure 20:
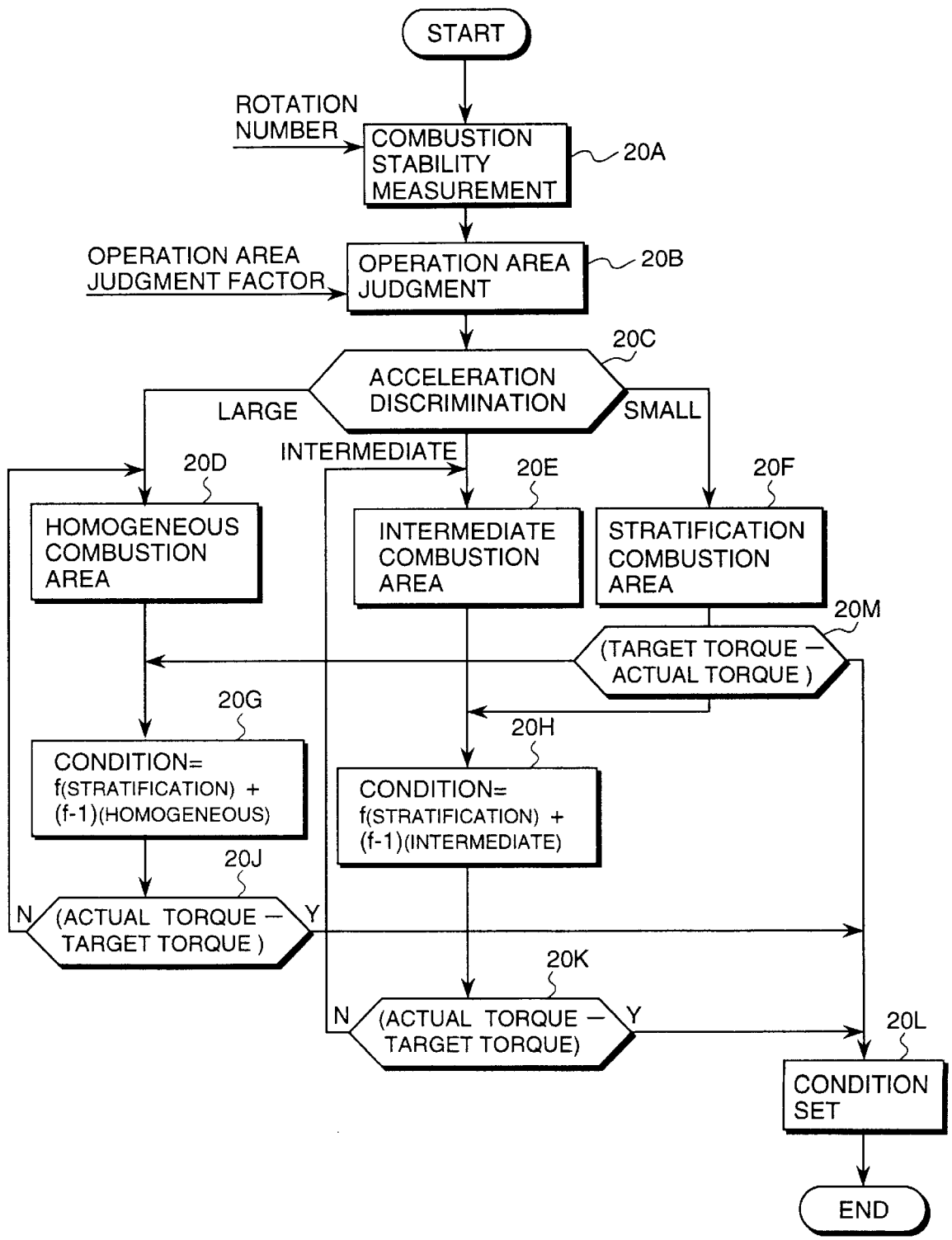
FIG. 20 is a flow chart showing a seventh embodiment of a direct injection internal combustion engine controlling apparatus according to the present invention.

Each of FIG. 18, FIG. 19 and FIG. 20 shows a flow chart concerning the combustion control of the direct injection internal combustion engine in a case where the operation condition of the engine is in a transient condition.

Now, in the flow chart shown in FIG. 18, at the acceleration judgment step 18C, when the acceleration judgment is larger than a predetermined value and then the homogeneous combustion is selected, in step 18D the time constant is set to one (1) so as to carry out the change-over from the stratification combustion which is the present combustion condition to the homogeneous combustion.

On the other hand, in step 18E, the time constant is set to two (2) so as to carry out the change-over from the stratification combustion which is the present combustion condition to the intermediate combustion.

As stated above, by setting suitably the value of the time constant, since it can change over by waiting for the change of the intake air flow amount, the torque stepwise difference which is generated due to the combustion condition change-over can be eliminated to counteract shock .

FIG. 19 is a flow chart showing a method for smoothing the operation property by improving further the stepwise change-over combustion condition. In other words, when during the acceleration time the stratification combustion is changed over to the homogenous combustion, as shown in step 19K, each time the control routine runs, a rate of the stratification combustion and a rate of the homogeneous combustion are varied with a function (f) and then the combustion condition is changed over.

The above stated function (f) is a factor which can be freely selected, for example, according to the operation condition, the size of the acceleration and the engine operation condition, etc.In accordance with the employment of this control method shown in FIG. 19 the intermediate combustion area can be gradually obtained.

Further, FIG. 20 is a flow chart showing a control method in a case where taking the vehicle condition into account as the operation property is regarded as important . As a key factor for securing the operation property, "a target engine torque" is determined in accordance with the engine rotation number, and the acceleration pedal step-in amount and then the acceleration judgment is carried out (step 20C).

As a result, the change-over among the stratification combustion, the homogenous combustion and the intermediate combustion is carried out, and alone therewith the respective combustion allocation is satisfied to the target engine torque . At the same time the combustion stability property can be selectively and optimally controlled.

Herein, when the acceleration judgment is small and as shown in a step 20F there is the stratification combustion, as shown in step 20M in accordance with a difference between the target torque and the actual torque, the method transfers to the homogenous combustion or to the intermediate combustion. As a result, the direct injection internal combustion engine achieves the objects of optimized operation property, fuel consumption and exhaust gas purification.

According to the present invention, with the improvement in the operation property, therefore it is possible to draw out improved performance of the direct injection internal combustion engine.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. In a direct injection internal combustion engine controlling apparatus having means for controlling a fuel injection amount and injection timing of fuel which is supplied to the engine, compromising a combustion controlling means for controlling the fuel to a homogenous combustion area for injecting the fuel in a respective cylinder during an intake stroke of the engine, a stratification combustion area for injecting the fuel in the respective cylinder during a compression stroke of the engine, and an intermediate combustion area between said homogenous combustion area and said startification combustion area for injecting dividingly the fuel at a predetermined rate during the respective intake stroke and the repective compression stroke;

means for discriminating an operation condition in accordance with at least one condition selected from a combustion condition of the engine, an output condition of the engine and a vehicle acceleration condition; and means for selecting at least one combustion selected form homogenous combustion, stratification combustion and intermediate combustion in accordance with a result of said operation-condition-discrimination-means.

2. In an apparatus according to claim 1, wherein said operation-condition-discriminating means is configured to utilize a concentration of smoke exhausted from the engine or a dispersion in said cylinder at every explosion stroke of the engine.

3. In an apparatus according to claim 1, wherein said operation-condition-discriminating means is configured to utilize a difference value between a target torque value and an actual torque value.

4. In an apparatus according to claim 1, wherein said operation-condition-discriminating means is configured to use indexes for indicating a stability degree of the operation condition which comprises a first predetermined value and a second predetermined value which is larger than said first predetermined value, to effect stratification combustion when said index for indicating the stability degree of the operation condition is smaller than said predetermined value, and to effect homogeneous combustion when said index is larger than second predetermined value.

5. In an apparatus according to claim 1, wherein said operation-condition-discriminating means is configured such that when a judgment result value is more than a predetermined value, in a transfer of each combustion among stratification combustion, homogenous combustion or intermediate combustion, during a predetermined transfer, an allocation rate of said homogenous combustion and said stratification combustion is changed gradually.

6. In an apparatus according to claim 5, wherein said operation-condition-discriminating means is configured to utilize a concentration of smoke exhausted from the engine or a dispersion in said cylinder at every explosion stroke of the engine.

7. In an apparatus according to claim 5, wherein said operation-condition-discriminating means is configured to utilize a difference value between a target torque value and an actual torque value.

8. In an apparatus according to claim 1, wherein said operation-condition-discrimination means is configured to discriminate with respect to a road-load condition and a vehicle acceleration condition.

9. A direct injection internal combustion engine controlling method for controlling a fuel injection amount and an injection timing of fuel supplied to a direct injection internal combustion engine, comprising the steps of controlling the fuel to a homogenous combustion area for injecting the fuel in a respective cylinder during an intake stroke of the engine, a stratification combustion area for injecting the fuel in the respective cylinder during a compression stroke of the engine, and an intermediate combustion area between said homogenous combustion area and said stratification combustion area for dividingly injecting the fuel at a predetermined rate during the respective intake stroke and the respective compression stroke;

discriminating an operation condition in accordance with at least one condition selected from a combustion condition of the engine, an output condition of the engine and a vehicle acceleration condition of a vehicle; and selecting at least one combustion selected from homogenous combustion, stratification combustion and intermediate combustion in accordance with a result of said operation condition discrimination step.

10. A method according to claim 9, wherein said operation condition discrimination step utilizes a concentration of smoke exhausted from the engine or a dispersion in said cylinder at every explosion stroke of the engine.

11. A method according to claim 9, wherein said operation condition discrimination step utilizes a difference value between a target torque value and an actual torque value is employed.

12. A method according to claim 9, wherein said operation condition discrimination step uses indexes for indicating a stability degree of the operation condition which comprises a first predetermined value and a second predetermined value which is larger than said first predetermined value, such that when said index for indicating the stability degree of the operation condition is smaller than said predetermined value, stratification combustion is effected and when said index is larger than second predetermined value, the homogenous combustion is effected.

13. A method according to claim 9, wherein said operation-condition-discrimination means is more than a predetermined value, in a transfer of each combustion among stratification combustion, homogenous combustion or intermediate combustion, during a predetermined transfer, an allocation rate of said homogenous combustion and said stratification combustion is changed gradually.

14. A method according to claim 8, wherein the step of discriminating comprises selectively discriminatory with respect to a road-load condition and a vehicle acceleration condition.

* * * * *